US008786930B2

(12) United States Patent
Kuo

(10) Patent No.: US 8,786,930 B2
(45) Date of Patent: *Jul. 22, 2014

(54) METHOD AND APPARATUS FOR GENERATION OF COHERENT FREQUENCY COMBS

(71) Applicant: Ram Photonics, LLC, San Diego, CA (US)

(72) Inventor: Ping Piu Kuo, San Diego, CA (US)

(73) Assignee: Ram Photonics, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/886,875

(22) Filed: May 3, 2013

(65) Prior Publication Data

US 2014/0133815 A1     May 15, 2014

Related U.S. Application Data

(63) Continuation of application No. 13/725,836, filed on Dec. 21, 2012, now Pat. No. 8,451,528.

(60) Provisional application No. 61/700,823, filed on Sep. 13, 2012.

(51) Int. Cl.
*G02F 1/07* (2006.01)
*G02B 6/00* (2006.01)
*H04B 10/40* (2013.01)

(52) U.S. Cl.
CPC ... *G02F 1/07* (2013.01); *G02B 6/00* (2013.01)
USPC ............. 359/264; 385/122; 385/1; 385/50; 385/31; 385/24; 398/81; 398/158; 398/199; 398/200

(58) Field of Classification Search
CPC .................................. G02F 1/07; G02B 6/00
USPC ........ 359/264, 279, 321, 322; 385/1, 2, 3, 24, 385/27, 28, 29, 30, 31, 50, 122; 398/81, 82, 398/147, 148, 158, 193, 199, 200
See application file for complete search history.

(56) References Cited

U.S. PATENT DOCUMENTS

| 7,440,112 B2 | 10/2008 | Kurokawa et al. |
| 7,483,608 B2 | 1/2009 | Inoue et al. |
| 7,650,080 B2 | 1/2010 | Yap et al. |
| 8,451,528 B1 | 5/2013 | Kuo |
| 2013/0051807 A1 | 2/2013 | Huang et al. |

OTHER PUBLICATIONS

Notice of Allowance for U.S. Appl. No. 13/725,836, mailed Apr. 17, 2013, 9 pages.

*Primary Examiner* — David N Spector
(74) *Attorney, Agent, or Firm* — Kilpatrick Townsend & Stockton LLP

(57) ABSTRACT

Embodiments of the invention provide apparatuses and methods for phase correlated seeding of parametric mixer and for generating coherent frequency combs. The parametric mixer may use two phase-correlated optical waves with different carrier frequencies to generate new optical waves centered at frequencies differing from the input waves, while retaining the input wave coherent properties. In the case when parametric mixer is used to generate frequency combs with small frequency pitch, the phase correlation of the input (seed) waves can be achieved by electro-optical modulator and a single master laser. In the case when frequency comb possessing a frequency pitch that is larger than frequency modulation that can be affected by electro-optic modulator, the phase correlation of the input (seed) waves is achieved by combined use of an electro-optical modulator and injection locking to a single or multiple slave lasers.

20 Claims, 12 Drawing Sheets

METHOD AND APPARATUS FOR GENERATION OF COHERENT FREQUENCY COMBS

CROSS-REFERENCES TO RELATED APPLICATIONS

This application is a continuation of U.S. patent application Ser. No. 13/725,836, filed on Dec. 21, 2012, now U.S. Pat. No. 8,451,528, which claims priority to U.S. Provisional Patent Application No. 61/700,823, filed on Sep. 13, 2012, entitled "Method and Apparatus for Generation of Coherent Frequency Combs," the disclosure of which is hereby incorporated by reference in its entirety for all purposes.

BACKGROUND OF THE INVENTION

An optical or radio-frequency (RF) source is commonly referred to as a frequency comb when it is represented by multiple tones that are equidistantly spaced in frequency domain. Various mechanisms can be used to generate a frequency comb. These are often classified with respect to the spectral comb bandwidth (frequency range over which frequency tones are generated), frequency stability, the spectral tone purity or signal-to-noise ratio (SNR) between the frequency tone and the noise measured within a specific bandwidth in its immediate spectral vicinity, the coherence and its power properties. Frequency combs can be used to establish a spectral reference that can be used to relate the position of spectral absorption or emission in precision ranging, spectroscopy or sensing applications. Consequently, the coherence properties of frequency comb are of particular importance and are defined by combined phase and amplitude noise present at each frequency tone that comprises the comb. In a variety of optical sources that are well stabilized in power, the phase noise dominates over the amplitude noise. Consequently, to preserve the clarity of the invention, we refer to phase noise only; this abbreviation is not meant to exclude the effect that the embodiments will have, in practice both noise mechanisms.

Phase noise manifests itself by broadening the spectral width of the laser (source) spectral width, commonly referred to as a linewidth. This effect is generally seen as an impairment, as broadening of the source linewidth decreases its coherency. Not only does the coherence decrease diminish the utility of optical radiation in applications such as communication and sensing, it also reduces the utility of the source for the purpose of frequency referencing. In practical terms, an ideal frequency reference would have negligible linewidth, allowing one to relate to any other frequency with arbitrary accuracy. In contrast, the physical source possesses a finite linewidth, inherently reducing the accuracy with which frequency gauging can be accomplished. Consequently, it is of large practical interest to reduce the spectral linewidth of the source; this motivation is particularly strong in the case of spectral comb generation, as each frequency tone included in the comb possesses a finite spectral linewidth.

The spectral reference can be established either locally, when the bandwidth of the frequency comb is smaller than a spectral octave, or globally, when the bandwidth of the frequency comb is equal to or exceeds a spectral octave. Both type of frequency combs can be used in metrology, spectroscopy, clock distribution, physical ranging and waveform synthesis, among other applications. To be practically useful, a device or means for frequency comb generation should be power efficient, possess sufficient spectral bandwidth, be characterized by a power equalized spectrum across the operational bandwidth and have high degree of coherency. The latter requirement can be described in terms of the spectral linewidth of frequency tones that constitute the frequency comb. In a coherent frequency comb generation process, the spectral linewidth of frequency tones should not increase with respect to a specific value commonly established at the input of the generating device. Of equal importance, the constant linewidth should be maintained across the entire comb range, regardless of the specific tone frequency position.

Common techniques for frequency comb generation include, in direct or indirect form, the use of optical or RF cavities to establish a frequency reference. Frequency comb generation using mode-locked (MLL) lasers is particularly widespread, and can be used in conjunction with nonlinear processes outside of the MLL cavity. An MLL source inherently represents the frequency comb: pulsed temporal output, when observed in spectral domain, correspond to a frequency comb whose bandwidth is directly defined by a gain width of the laser material, with the rest of parameters dictated by the specifics of the physical mode locking mechanism. In the temporal domain, the separation between adjacent optical pulses of an MLL output is referred to as the repetition rate; in the spectral domain, an inverse of the repetition rate defines the frequency pitch (separation between adjacent spectral peaks) of the frequency comb. An MLL is often used to seed the nonlinear process in order to enhance the bandwidth or other performance parameters of the frequency comb. When coupled with various feedback mechanisms, this approach has led to the demonstration of wideband and low-noise devices used in wave-forming, ranging and spectroscopy.

The use of an MLL source for frequency comb generation necessarily introduces performance limitations. The most severe limit is imposed by requirement placed on the MLL cavity stability. In the case when the MLL cavity is not absolutely stabilized, its output is characterized by temporal and spectral uncertainty (fluctuations). In the case when a nonlinear process is used to expand or enhance the MLL response to create a frequency comb, these fluctuations are further amplified, thus degrading the accuracy and overall performance of the frequency comb source. While many techniques for MLL stabilization were reported and developed in the past, the fundamental limit is established by physical coupling between the frequency pitch (repetition rate) and the cavity physical size. A higher repetition rate (higher frequency pitch) requires a shorter physical cavity in either the optical or the RF domain. Consequently, the tolerance required to control such a cavity length decreases until it reaches a physical scale that cannot be physically realized.

In an alternative to the conventional approach, frequency comb synthesis can be accomplished without an MLL seed. Instead, a continuous-wave (CW) source can be used to seed the frequency comb generation process. As cavity stability of the CW source exceeds that of the MLL source, the inherent limits associated with an MLL or any other pulsed source can be circumvented.

Despite the availability of some optical sources providing frequency combs, there is a need in the art for methods and systems for fiber-based amplifiers with repeatable output pulse characteristics independent of the pulse repetition frequency.

SUMMARY OF THE INVENTION

Embodiments described herein relate to methods and systems for the generation of multiple frequency tones possessing controlled coherency, and more specifically to achieve this by using a parametric mixer device seeded by two or more phase-correlated optical waves with different carrier frequencies.

Embodiments described herein provide means for generating optical frequency tones with controlled spectral linewidth. In one embodiment, a parametric mixer is seeded by phase correlated optical waves possessing different carrier frequencies in order to produce multiple optical tones centered at new carrier frequencies and possessing an approximately constant spectral linewidth. The phase correlation between the seed optical waves is specifically used to generate multiple new optical waves with carrier frequencies that are defined by multiples of the seed wave frequency separation. In one embodiment, when a parametric mixer is driven by phase correlated seeds and is designed to match the frequency separation and the powers of the input waves, the frequency comb generated by the mixer possesses approximately the same coherency as the seeding waves.

One embodiment describes a specific means to generate a large number of optical waves with strictly controlled coherency with two seed waves derived from the single master source.

In another embodiment, the specific means for phase correlation necessary for generation of coherency-controlled frequency comb is described.

In one embodiment, the means for phase correlation between optical tones serving as a seed for a comb generating mixer is described using an optical modulator.

In a separate embodiment, the means for phase correlation between optical tones serving as seeds for the comb generating mixer is described using both an optical modulator and injection locking between the master and slave lasers.

In another embodiment, the use of multiple phase-correlated waves to seed a parametric mixer to affect an increase in signal-to-noise ratio of the frequency comb generated by the mixer is described.

In one embodiment, an optical mixer has an input of at least two phase-correlated light waves whose center frequency is different. The purpose of the input is: (i) to generate new optical waves whose center frequencies are defined by multiples of the frequency separation between the two input waves, and (ii) to guarantee that the spectral linewidth of newly generated waves is controlled and is approximately equal to the spectral linewidth of the input waves. In one embodiment, the phase-correlated input light waves are continuous in the time domain. In another embodiment, the phase correlated input light waves are modulated in the time domain. In one embodiment, the output optical field contains frequency component(s) which is (are) not present in the input optical field. In one embodiment, at least one section of the optical medium has a third-order nonlinear optical response, and has a nonlinear coefficient of at least 2 $(W \cdot km)^{-1}$ measured at the frequency of one of the input light waves. In another embodiment, at least one section of the optical medium has a second-order nonlinear optical response, and has a maximum value of nonlinear susceptibility of at least $0.5 \times 10^{-12}$ m/V measured at the frequency of one of the input light waves.

In another embodiment, a frequency comb generating device comprises an optical mixer and phase-correlated light wave input. In one embodiment, the optical mixer is designed to match the input frequencies and powers of the input light waves. The optical mixer is designed to generate frequency combs over a specified spectral bandwidth.

In a specific embodiment, a frequency comb generating device uses at least two light waves with different carrier frequencies at the input of a parametric mixer that possesses a degree of phase correlation that is sufficient to maintain the spectral linewidth of all the frequency tones at the output of the mixer device.

In another specific embodiment, a frequency comb generating device uses at least two light waves with different carrier frequencies at the input of parametric mixer that possesses a degree of phase correlation that is sufficient to maintain the spectral linewidth of all generated frequency tones at the output of the mixer device that is designed specifically to generate a frequency comb output.

In one embodiment, the phase correlation is achieved by using an optical modulator device to generate the output comprising two tones with different carrier frequencies. In another embodiment, the phase correlation is achieved by an optical modulator device generating the output comprising more than two tones with different carrier frequencies. In a specific embodiment, the phase correlation is achieved by injection locking a slave laser to a frequency-modulated master laser. In another specific embodiment, the phase correlation is achieved by injection locking a set of slave lasers to a modulated master laser.

In yet another specific embodiment, an apparatus is provided for attaining an increase in the signal-to-noise ratio of an optical frequency comb generated using an optical parametric mixer seeded by at least two waves with different frequencies. The increase in the signal-to-noise ratio is achieved by phase-correlation of the optical waves used at the input of the optical mixer.

In yet another specific embodiment, an apparatus is provided for suppression of the noise level in an optical frequency comb generated using an optical parametric mixer seeded by at least two waves with different frequencies. The suppression of the noise is achieved by phase correlation of the optical waves used at the input of the said mixer.

In a further embodiment, generation of an optical frequency comb is accomplished using phase-correlated light waves with different carrier frequencies. The phase-correlated light waves are launched at the input of the parametric mixers that comprise more than one nonlinear waveguide.

In another further embodiment, generation of frequency combs is accomplished using more than two phase-correlated light waves with different carrier frequencies. The more than two phase-correlated light waves are launched at the input of the parametric mixers, resulting in an increase of signal-to-noise ratio of new frequency tones generated in mixer.

Numerous benefits are achieved by way of the present invention over conventional techniques. For example, embodiments of the present invention reduce the residual frequency noise in stabilized optical and/or electrical frequency sources. Some embodiments provide spectral linewidth reduction. Additionally, embodiments of the present invention improve the signal to noise ratio of optical frequency comb sources. Embodiments of the present invention also enhance the frequency tenability of frequency-stabilized optical sources. As described herein, various embodiments provide practical advantages in multitude applications. For example, the invention improves the sensitivity and operating wavelength range of optical spectroscopy apparatus. As another example, the invention increases the link budget of coherent optical communication systems by reducing the phase noise and amplitude noise of the transmitter sources and local oscillators. These and other embodiments of the invention along with many of its advantages and features are described in more detail in conjunction with the text below and attached figures.

DETAILED DESCRIPTION OF THE INVENTION

Embodiments of the present invention related to methods and systems for generation of wideband, highly coherent frequency combs. The coherent generation across the entire frequency comb range is accomplished by seeding a parametric mixer using phase correlated optical sources with different carrier frequencies. Embodiments of the invention provide techniques for seed phase correlation, the coherence characteristics of frequency comb seeded by phase-correlated waves and its implications for practical applications.

The inventors have determined that two CW sources (tones) can be used to seed an optical mixer and to generate new frequency tones possessing superior frequency stability. In an ideal mixing process, a large number of spectrally equidistant tones can be generated, thus creating a wideband frequency comb. Such generation, while circumventing instabilities inherent to MLL cavities, is ultimately limited by the increase of phase noise (spectral linewidth) originating in energy- and phase-conservation laws governing seeded parametric mixing processes. In practical terms, the linewidth of a spectral tone comprising the frequency comb progressively grows as the frequency separation (also referred to as the mixing order) from the seed (input) wave frequency increases. This fact materially affects the utility of the frequency comb as the coherency of the constituent tone decreases with its mixing order.

A frequency comb can be generated over a wide spectral bandwidth and with sufficiently spectral purity if two or more CW tones are used to seed the optical parametric mixer designed to receive such input. The generation utilizes precise control of phase matching and waveform shaping within the mixer in order to achieve the desired mixing efficiency over a sufficiently wide spectral bandwidth while concurrently suppressing the noise generation and its amplification in this process. The construction of such a parametric mixer can be accomplished using multiple optical stages that play distinct roles in frequency comb generation.

Embodiments of the present invention provide techniques for creating a large count of new frequency tones while preserving the spectral linewidth of the generated tones and maintaining the spectral linewidth approximately equal to the linewidth of the waves used to seed the parametric mixer. The linewidth of a frequency tone is defined herein as the full-width at half-maximum of the frequency spectrum of the frequency tone. Equivalently, this means that newly generated tones retain the degree of coherency set by the input (seed) waves across the entire frequency comb spectral range.

Figure 1A:
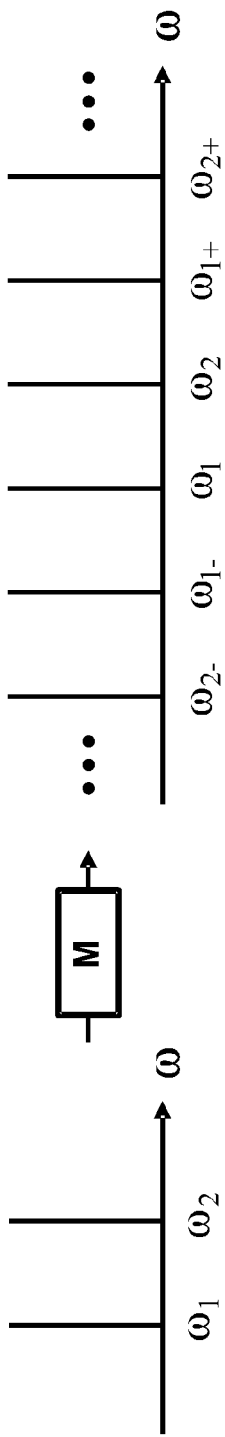
FIG. 1A illustrates continuous-wave (CW)-seeded frequency comb generation in an ideal case.
Figure 1B:
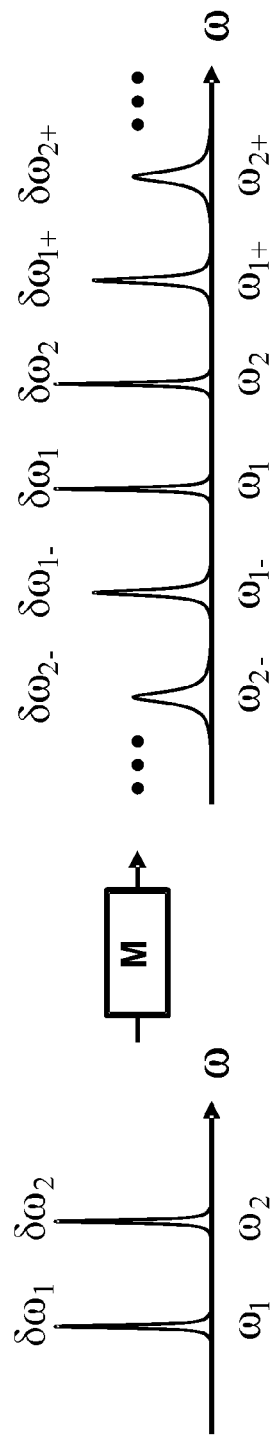
FIG. 1B illustrates CW-seeded frequency comb generation in a physical case in which each input wave has a finite spectral linewidth and the input waves are not phase-correlated with respect to each other.

Embodiments of the invention overcome the basic impairment associated with frequency comb generation using CW tone seeding of a parametric mixer. FIGS. 1A and 1B illustrate the principle CW seeded frequency comb generation in an ideal case and a physically feasible case, respectively. In the ideal case, two frequency tones used to seed the parametric mixer possess negligible spectral linewidth ($\delta \sim 0$). Equivalently, the coherence of such laser sources is arbitrarily high, as their fields possess complete correlation in the temporal domain, regardless of the time interval in which the field comparison is made. Equivalently, the carrier frequency of an ideal CW seed can be measured with arbitrary accuracy. Consequently, the creation of new frequency tones using ideal CW seeds would possess similar frequency certainty. The creation of new frequency tones from seed frequencies is governed by energy- and momentum-conservation laws. As an illustration, the first-order tones ($\phi_{1+}$ and $\phi_{1-}$) are created by a four-photon mixing process seeded by two waves $\omega_1$ and $\omega_2$ that are commonly referred to as pumps:

$$\omega_{1+} = 2\omega_2 - \omega_1 \tag{1a}$$

$$\omega_{1-} = 2\omega_1 - \omega_2 \tag{1b}$$

Equations 1a and 1b are a direct consequence of energy conservation during the mixing process. The parametric mixing also preserves the momentum between seed (pumps) and newly generated photons, commonly expressed as:

$$\theta_{1+} = 2\theta_2 - \theta_1 \tag{2a}$$

$$\theta_{1-} = 2\theta_1 - \theta_2 \tag{2b}$$

where $\theta_{1,2}$ and $\theta_{1+/-}$ represent the phases of pumps and newly generated (first-order) tones. Consequently, the phase of the $N^{th}$ order generated frequency tone can be written in terms of the seeding pump phases:

$$\theta_{N+} = (N+1)\theta_2 - N\theta_1 \tag{3a}$$

$$\theta_{N-} = (N+1)\theta_1 - N\theta_2 \tag{3a}$$

In contrast to a simplified mixing process associated with ideal ($\delta \sim 0$) seeds (see FIG. 1A), a physical laser seed possesses carrier frequency (phase) that cannot be defined with absolute certainty: its emission is described by a finite spectral linewidth ($\delta > 0$). As a result, the mixing in a physically realizable parametric mixer is more accurately described by FIG. 1B. When two such lasers seed the parametric mixer, the frequency (phase) uncertainty is inherently mapped onto all newly generated frequency tones. In the case when the phase of each seed laser is an independent random process, the creation of new frequency tones leads to a progressively larger spectral linewidth that can be precisely quantified: the phase evolution of commonly used laser devices can be described by a white Gaussian random process, dictating its spectrum as a Lorentzian shape. In the case when two such lasers are independently operated, random processes governing the phase evolution in each laser are independent (uncorrelated). Furthermore, it can be shown that the spectral linewidth of the $N^{th}$ generated tone in this scenario is:

$$\delta\omega_{N+} = (N+1)^2 \delta\omega_2 + N^2 \delta\omega_1 \quad (4a)$$

$$\delta\omega_{N-} = (N+1)^2 \delta\omega_1 + N^2 \delta\omega_2 \quad (4b)$$

where $\delta\omega_{1,2}$ represents the spectral linewidth of the seed pumps. In the case when the laser phase is described by a distribution corresponding to 1/f noise, the spectral lineshapes of the tones can be approximated by Gaussian functions. In this case, the spectral linewidth of the $N^{th}$ tone is found to follow the relationship below:

$$\delta\omega_{N+} = (N+1)\delta\omega_2 + N\delta\omega_1 \quad (5a)$$

$$\delta\omega_{N-} = (N+1)\delta\omega_1 + N\delta\omega_2 \quad (6b)$$

In practice, commonly used lasers possess a phase distribution that is neither purely white nor have 1/f noise characteristics. Rather, physically realizable devices exhibit phase evolution that has a contribution from both distribution types. As a consequence, the $N^{th}$ tone generated in physical, independent (uncorrelated) laser seeded mixing will possess a spectral linewidth that is bound by quadratic (upper limit) and linear (lower limit) laws. In practice, the higher the order of the frequency tone generated within the frequency comb, the higher its spectral linewidth, regardless of the linewidth scaling law that is applicable to a specific laser device.

This spectral linewidth broadening is a detrimental effect as it directly leads to a loss of the coherency across the frequency comb generated by the CW seeded mixer. Furthermore, frequency tones comprising the frequency comb are not simultaneously generated within the parametric mixer. Instead, higher-order tone generation relies on generation of frequency tones of lower orders. Consequently if frequency tones are progressively broadened, they necessarily introduce additional phase noise to the parametric mixing process responsible for the generation of the subsequent tone orders. In effect, the spectral broadening process inherently increases an overall mixer noise generation, thus providing an addition impairment mechanism to frequency comb generation. In contrast to ideal seeding (pumps with negligible spectral linewidth), physical seed lasers lead to a simultaneous increase in spectral linewidth and the loss in signal-to-noise ratio of the newly generated frequency tone. The former impairment is inherent to parametric mixing since it must satisfy energy and momentum conservation during CW seeded frequency generation. As shown above, this leads to an increase (scaling) in phase uncertainty (spectral linewidth) of the generated tones. The scaling process can be prevented in the case when phase noise in each laser is not independent of each other. Indeed, if the phases in seed lasers are correlated, they will differ by a constant (deterministic) value. In other words, the phase of each laser will be described by the same random process, shifted by a constant value with respect to each other. In this case, the phase of the first order tone is given as:

$$\theta_{1+} = \theta_1 + \Delta\theta \quad (6a)$$

$$\theta_{1-} = \theta_1 - \Delta\theta \quad (6b)$$

where the phases of two pump seeds are described by the identical random processes differing at most by a deterministic, constant value: $\theta_1 - \theta_2 = \Delta\theta$. Under this condition, it can be shown that the phase of the $N^{th}$ tone will be defined by:

$$\theta_{N+} = \theta_1 + N\Delta\theta \quad (7a)$$

$$\theta_{N-} = \theta_1 - N\Delta\theta \quad (6b)$$

Figure 1C:
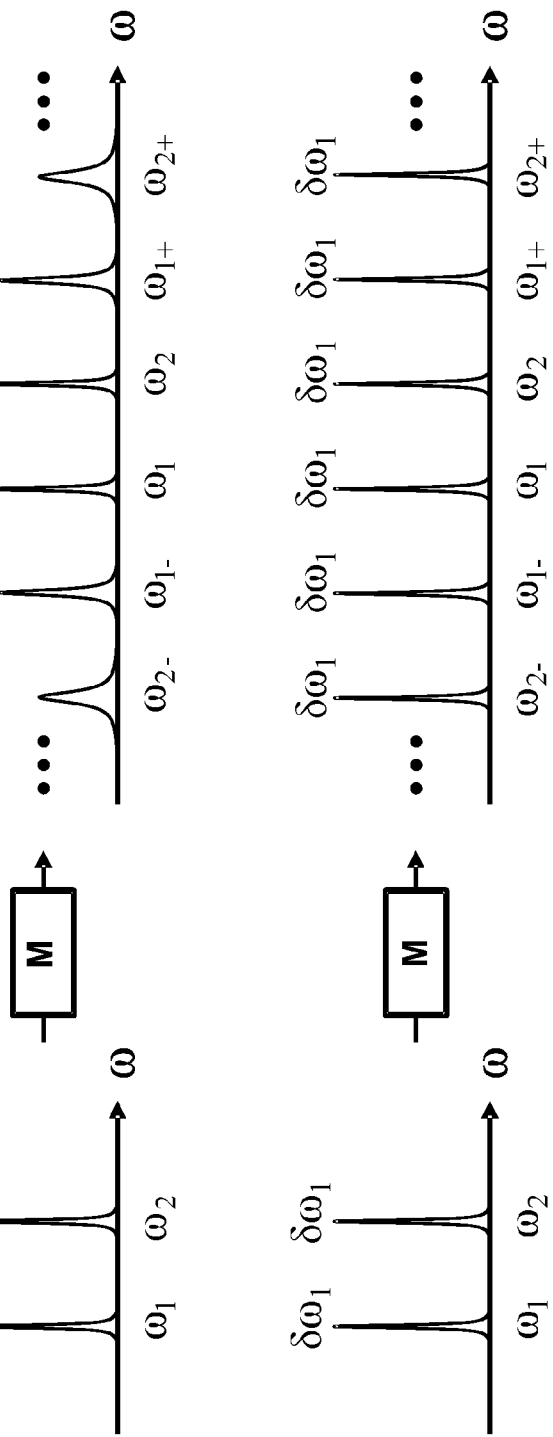
FIG. 1C illustrates CW-seeded frequency comb generation in a physical case in which each input wave has a finite spectral linewidth and the input waves are phase-correlated with respect to each other.

Equations 7a and 7b indicate that the phase of the $N^{th}$ tone can be described by an identical random process governing the seed lasers, differing at most by a deterministic (constant) value of $N\Delta\theta$. Consequently, this means that the spectral linewidth of the original seed will be preserved in the $N^{th}$ tone within the frequency comb. The coherent properties (governed by the spectral linewidth) of the original seed laser will be also preserved across the frequency comb, as illustrated in FIG. 1C.

Figure 2:
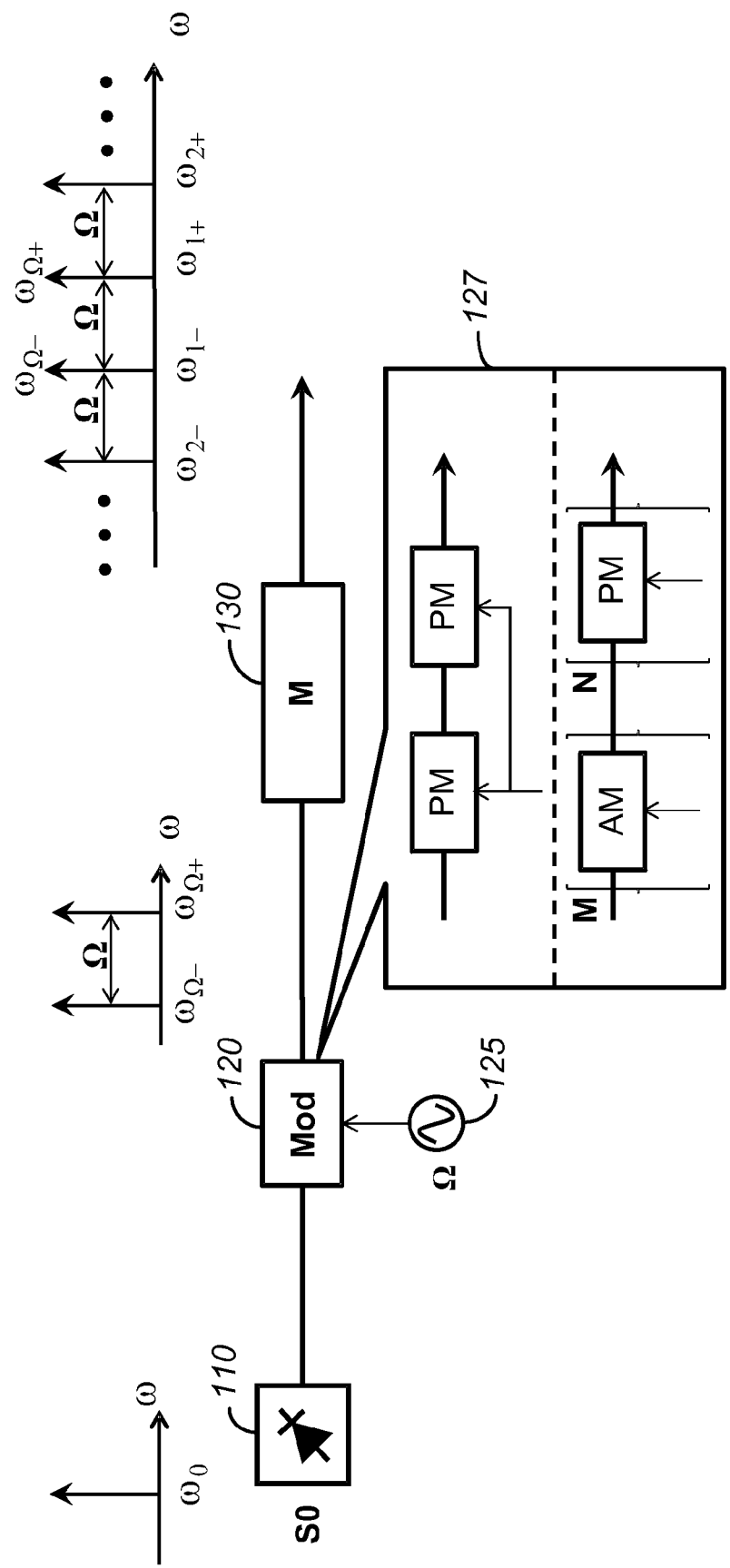
FIG. 2 is a simplified block diagram of a system for CW-seeded frequency comb generation according to an embodiment of the invention.

Techniques for Phase-Correlated Seeding of a Parametric Mixer:

FIG. 2 is a simplified block diagram of a system for CW-seeded frequency comb generation according to an embodiment of the invention. The embodiment illustrated in FIG. 2 provides techniques for achieving correlation between two pump seeds used to generate a frequency comb via high-order parametric mixing. An optical source 110 (e.g., a laser) also referenced as S0) is modulated in order to create two distinct frequency tones separated by $\Omega = \omega_{\Omega+} - \omega_{\Omega-}$. The modulation can be accomplished by a conventional electro-optic modulator (EOM), including both phase- or intensity-modulators. An inset 127 shown in FIG. 2 describes the use of a single or cascaded phase-modulator (PM) in conjunction with amplitude modulators (AM) in order to create multiple frequency tones separated by a radio-frequency (RF) beat used to define the tone spectral separation.

In the simplest case, only two tones ($\omega_{\Omega-}$ and $\omega_{\Omega+}$) are generated and used to seed the parametric mixer 130 (also referenced as M). Since both tones are derived from a single optical source, the process describing each frequency carrier is highly correlated. In the case when one of the seeding tone frequencies is identical to the master laser frequency (say, $\omega_{\Omega-} = \omega_0$) and the second seeding tone corresponds to the carrier shifted by RF frequency (say, $\omega_{\Omega+} = \omega_0 + \Omega$), the correlation between two tones will be impaired only by the phase noise of the RF generator 125 (also referred to as an oscillator) used to drive the modulator 120. Conversely, when each tone generated by the modulator (also referred to as an EOM) differs from the original master laser frequency, the RF generator phase noise will be mapped to both.

Figure 3:
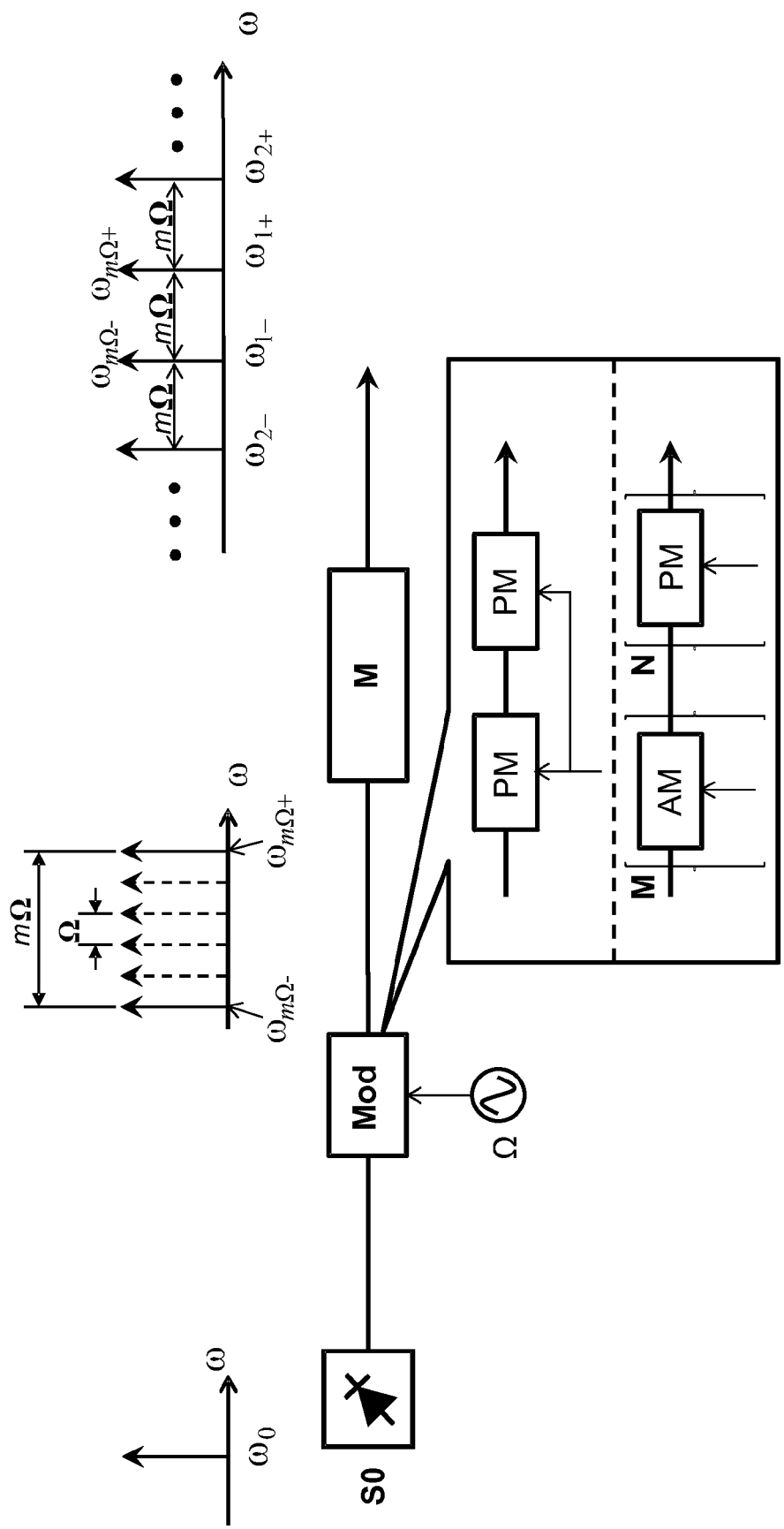
FIG. 3 is a simplified block diagram of a system for CW-seeded frequency comb generation according to another embodiment of the invention.

The separation between two tones is defined by the RF drive frequency ($\Omega$) provided by RF generator 125 and the operational bandwidth of the modulator 120 (EOM). Practical EOMs are characterized by a bandwidth that is not substantially higher than 50 GHz, thus limiting the extent over which comb frequency pitch can be controlled. This deficiency can be addressed by driving the EOM comprising the modulator block (Mod) to produce multiple frequency tones, as shown in FIG. 3. Elements already discussed in relation to FIG. 2 are not marked with reference numbers in subsequent figures for purposes of clarity. Accordingly, similar elements in the following figures can be referenced by the corresponding elements in FIG. 2.

FIG. 3 is a simplified block diagram of a system for CW-seeded frequency comb generation according to another embodiment of the invention. As illustrated in FIG. 3, in addition to the two tones illustrated in FIG. 2, an additional number of tones are generated over a frequency band equal to mΩ. This allows for selection of frequency tones that are separated by multiples of the original RF frequency (Ω) by rejecting the rest of generated tones. Subsequently these tones can be separated by a wider spacing and can be used to seed the parametric mixer (M).

Figure 4:
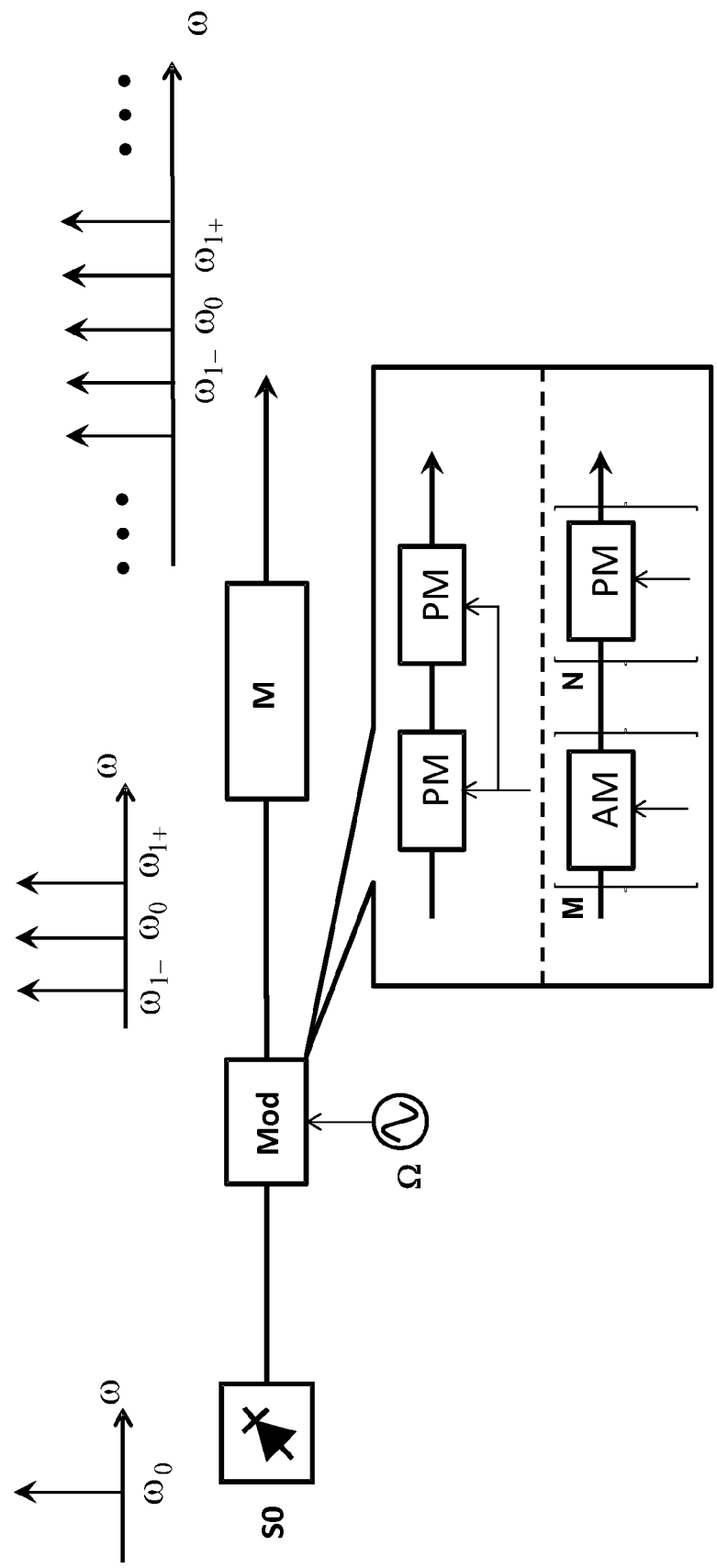
FIG. 4 is a simplified block diagram of a system for CW-seeded frequency comb generation according to yet another embodiment of the invention.

FIG. 4 is a simplified block diagram of a system for CW-seeded frequency comb generation according to yet another embodiment of the invention. In the approach shown in FIG. 4, multiple tones generated by the modulator block (Mod), can be selected and used to seed the parametric mixer. In this example, three tones are utilized, but embodiments of the present invention are not limited to this particular number and other suitable numbers of tones can be utilized. Multiple tone seeding can be used to coherently enhance the signal-to-noise ratio (SNR) of frequency tones generated in the parametric mixer (M). One of ordinary skill in the art would recognize many variations, modifications, and alternatives.

In most cases of practical interest, the modulation of the master laser induces substantial optical loss. Additionally, EOM devices cannot typically tolerate high optical input powers. As a consequence, the seeding tone power that can be used at the input of the parametric mixer (M) is limited, leading to inefficient and bandwidth-limited frequency comb generation. While seed tones can be amplified before being launched into the parametric mixer stage, this also typically introduces an excess (amplification) noise and leads to phase de-correlation between the two seed tones.

Figure 5:
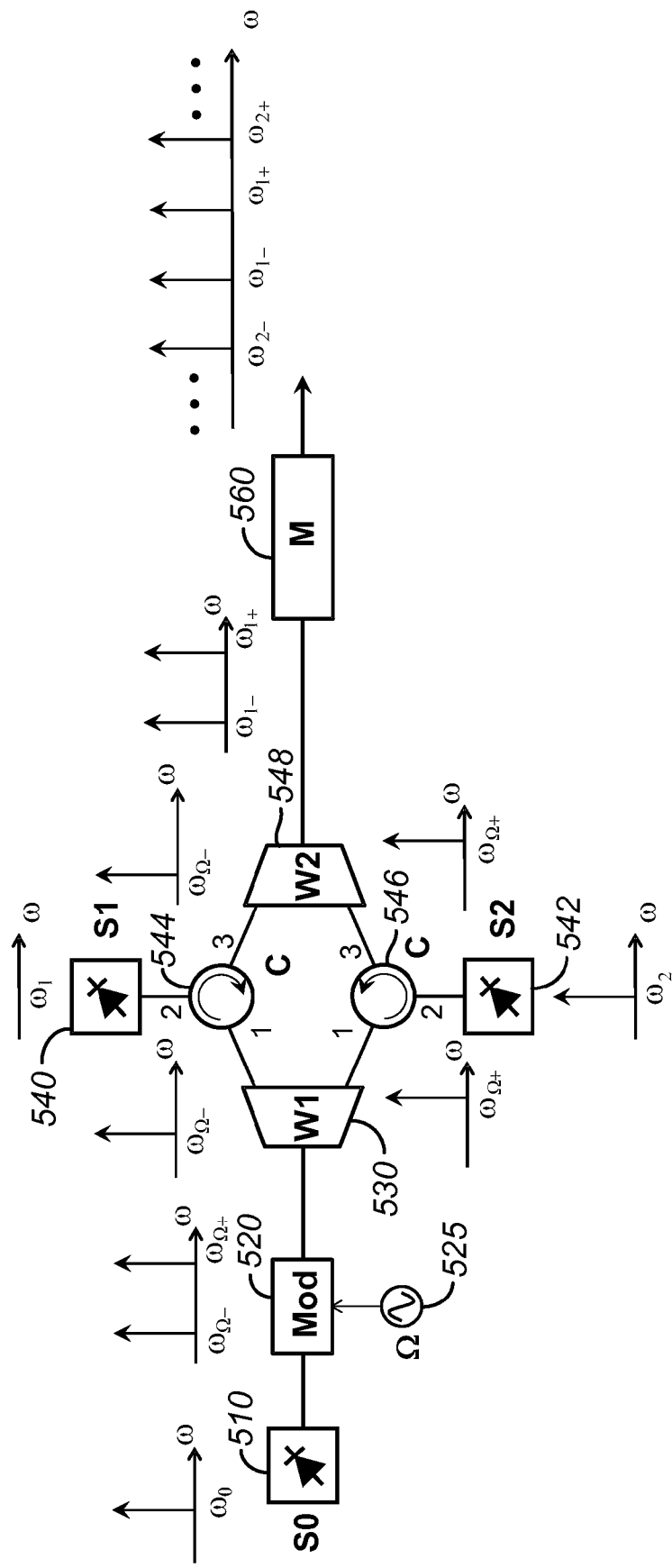
FIG. 5 is a simplified block diagram of a system for CW-seeded frequency comb generation according to a specific embodiment of the invention.

To overcome these limitations, the correlation between seed lasers can be accomplished by an injection-locking configuration, as shown in FIG. 5.

FIG. 5 is a simplified block diagram of a system for CW-seeded frequency comb generation according to a specific embodiment of the invention. As illustrated in FIG. 5, the master laser 510 (S0) with carrier frequency $\omega_0$ is sent to the modulator block 520 (Mod) and is split into two tones with frequencies $\omega_{\Omega-}$ and $\omega_{\Omega+}$ by optical splitter 530 (W1). In the case when the modulator generates only one new frequency, i.e. when $\omega_{\Omega-}=\omega_0$ and $\omega_{\Omega+}\neq\omega_0$ or when $\omega_{\Omega+}=\omega_0$ and $\omega_{\Omega-}\neq\omega_0$, one of the slave lasers 540 or 542 (S1 or S2) can be eliminated; otherwise, both slave lasers are used in the injection locking configuration. The master laser can be a fiber laser, external cavity laser (e.g., external cavity semiconductor lasers), and the like and the slave lasers can be distributed feedback (DFB) lasers, Fabry-Perot lasers, distributed Bragg reflector (DBR) lasers, other types of semiconductor lasers, and the like.

Slave lasers 540 and 542 (S1 and S2) produce emission at frequencies $\omega_1$ and $\omega_2$, respectively, in the case when no input light (ports 2 of the circulators 544 and 546 (C) in FIG. 5) is provided to their cavities. These frequencies can differ from the input frequencies $\omega_{\Omega-}$ and $\omega_{\Omega+}$ provided after the modulator (Mod) driven by RF drive 525. This difference is typically smaller than the injection locking bandwidth of both slave lasers S1 and S2. When this condition is met and master tones $\omega_{\Omega-}$ and $\omega_{\Omega+}$ possess sufficient optical power, slave lasers will lock and produce emission at the master frequencies $\omega_{\Omega-}$ and $\omega_{\Omega+}$.

Since the slave laser is not required to possess a high degree of coherency (or, equivalently, to have narrow spectral linewidth), the power of the slave emission can be substantially higher than that of the master laser S0. After injection locking is achieved, the coherency of the slave laser emission is approximately equal to that of the master laser. The emission of both slave lasers are then correlated in phase, and dictated by the phase distribution of the master laser source. Consequently, the emissions of the frequency locked slave lasers is combined at optical combiner 548 (W2) and launched into parametric mixer 560 (M). Consequently, the combination of higher emission power and phase correlation is used to achieve more efficient and more coherent frequency comb generation than that allowed in the configuration associated with other implementations.

Figure 6:
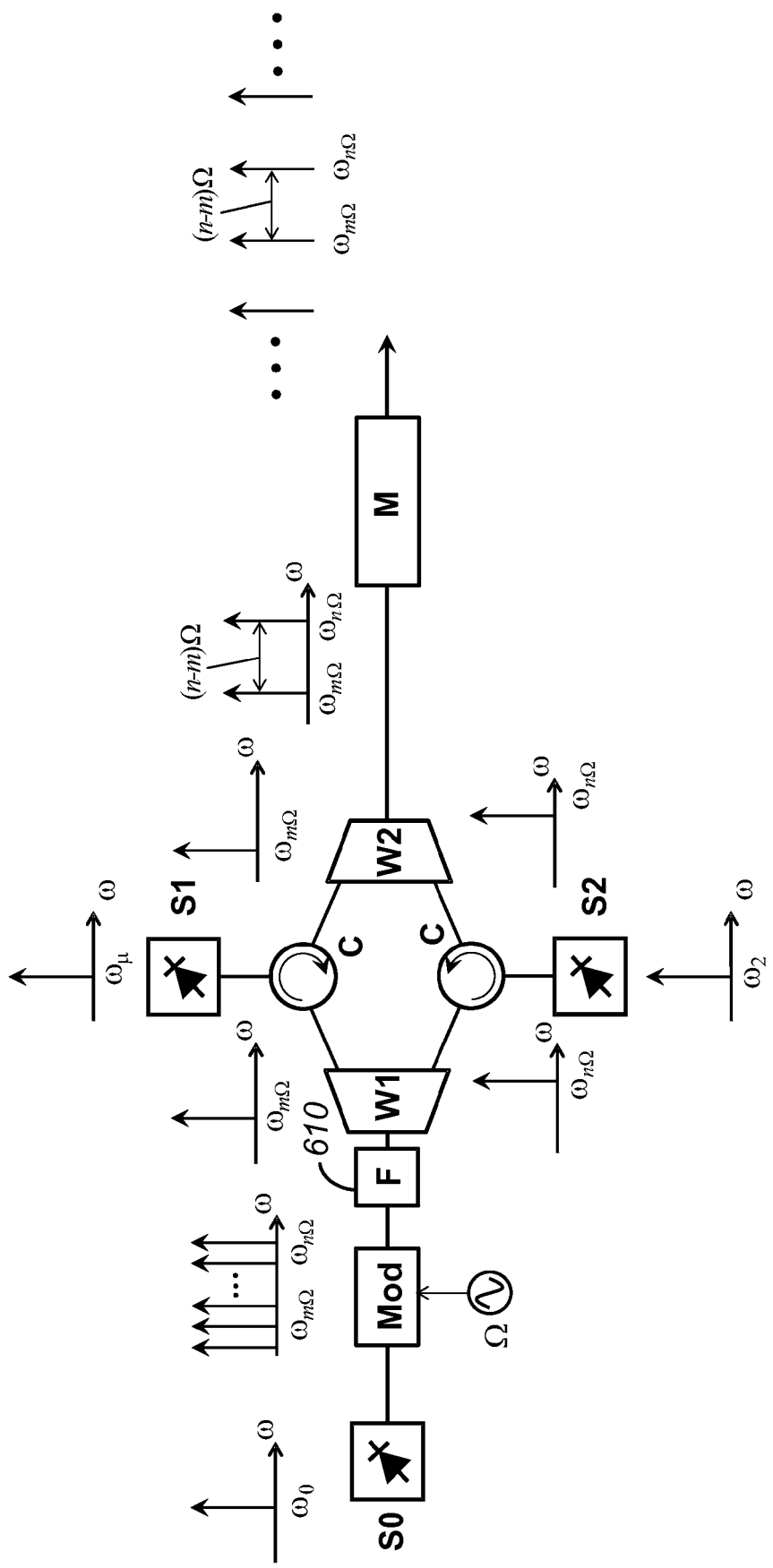
FIG. 6 is a simplified block diagram of a system for CW-seeded frequency comb generation according to another specific embodiment of the invention.

In the case when modulator (Mod) cannot produce two new frequency tones that are sufficiently separated, it is possible to generate multiple new tones, as shown in FIG. 6.

FIG. 6 is a simplified block diagram of a system for CW-seeded frequency comb generation according to another specific embodiment of the invention. In FIG. 6, elements already discussed in relation to FIG. 5 are not marked with reference numbers for purposes of clarity. Accordingly, similar elements in the following figures can be referenced by the corresponding elements in FIG. 5. The separation between new tones is governed by the frequency of RF drive (Ω). Consequently the separation between two seed tones can be selected as a multiple of RF frequency (Ω). As an example, by selecting tones $\omega_{m\Omega}$ and $\omega_{n\Omega}$ ($\omega_{n\Omega}>\omega_{m\Omega}$) after the modulator (Mod), the separation between seed tones is (n−m)×Ω. The selected tones are filtered out by bandpass filter 610 (F) and used to injection-lock two slave lasers S1 and S2, in a procedure similar to that described above.

Figure 7:
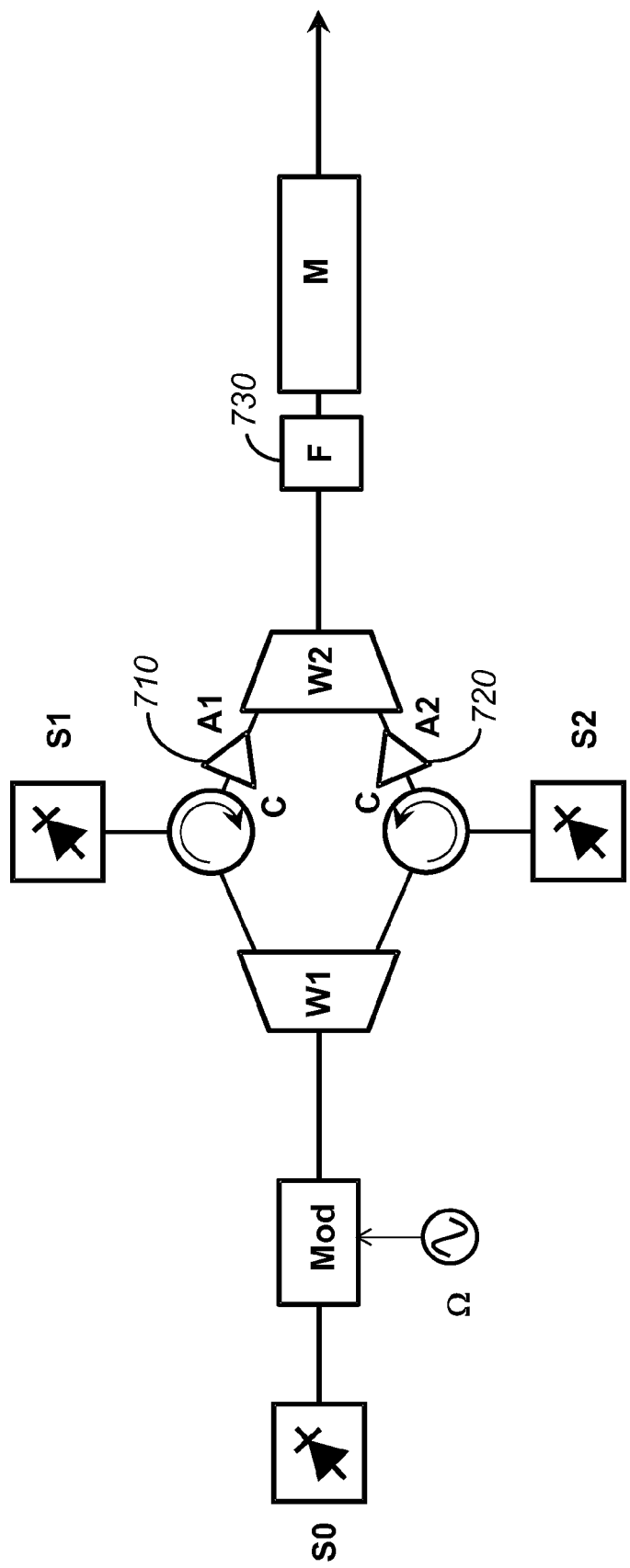
FIG. 7 is a simplified block diagram of a system for CW-seeded frequency comb generation according to a further specific embodiment of the invention.

In the case when slave laser power is not sufficient to achieve the desired efficiency and bandwidth for frequency comb generation in mixer (M), their output can be amplified by individual gain elements (A1 and A2) as shown in FIG. 7.

FIG. 7 is a simplified block diagram of a system for CW-seeded frequency comb generation according to a further specific embodiment of the invention. Gain elements 710 and 720 (A1 and A2) can be any optical amplifiers such as erbium-doped fiber amplifiers (EDFA) or semiconductor optical amplifiers (SOA). The output of any optical amplifier will have excess noise, such as amplified spontaneous emission (ASE). The portion of this noise that is out-of band with respect to the seed tones used to drive mixer element (M) can be filtered to prevent noise seeding of the parametric mixer process and a resulting decrease in frequency comb SNR. Noise filtering can be achieved by beam combining element (W2). In the case when the filtering by W2 is not practical or simply does not possess a sufficient suppression, an additional filtering element 730 (F) can be used prior to the mixer element (M).

Figure 8:
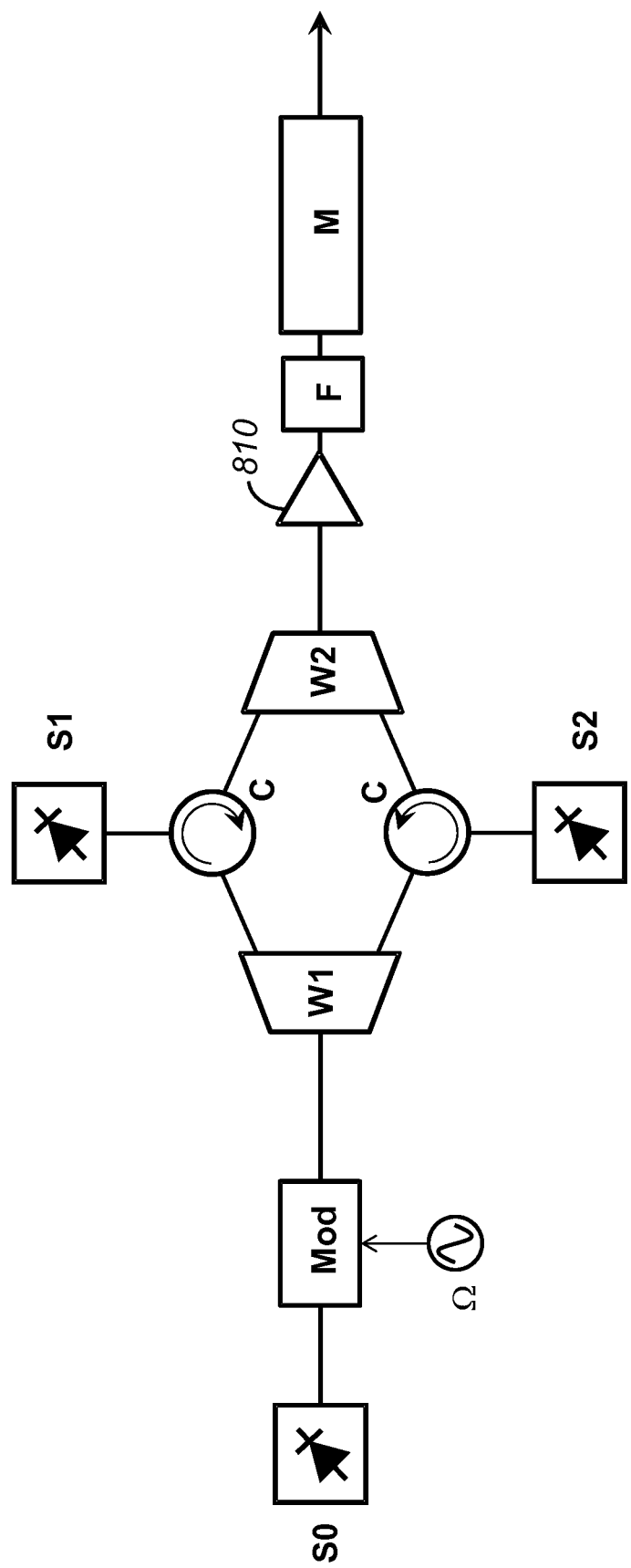
FIG. 8 is a simplified block diagram of a system for CW-seeded frequency comb generation according to an alternative embodiment of the invention.

The use of two separate amplifiers in each arm containing the slave lasers can be replaced by the use of a single amplification unit (A), as shown in FIG. 8.

FIG. 8 is a simplified block diagram of a system for CW-seeded frequency comb generation according to an alternative embodiment of the invention. The noise generated by the amplifier 810 in this configuration will be increased with respect to the one shown in FIG. 7, since combining element W2 possesses a finite insertion loss. However, when the slave laser emission possesses sufficient power, this loss is easily compensated. In case when the slave laser emission is high enough, the amplifier 810 (A) can be operated in a saturation regime, corresponding to low noise at its output. When noise generated by the amplifier A cannot be tolerated at the input of the parametric mixer (M), an optical filter (F) is used to filter out seed tones and suppress out-of-band noise.

Figure 9:
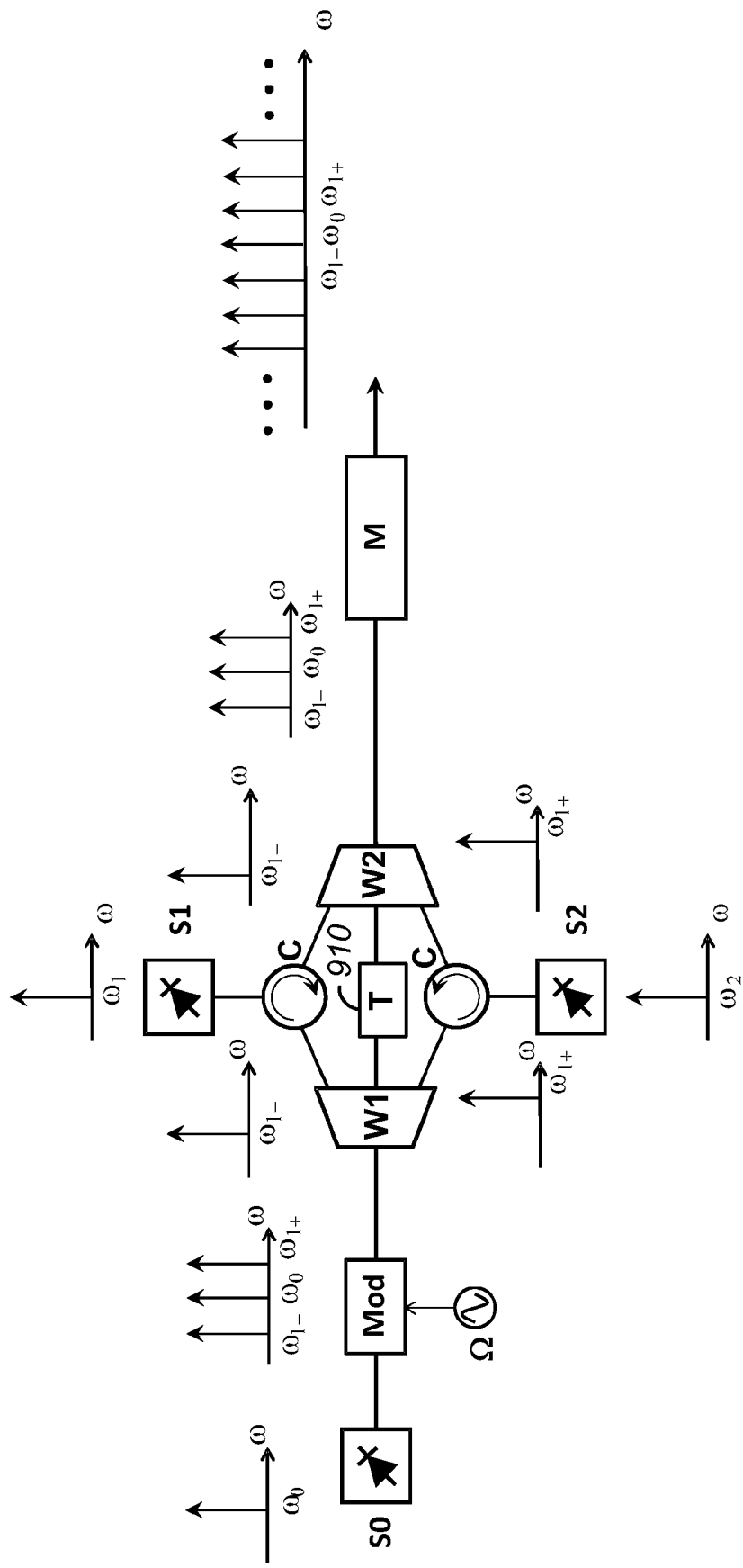
FIG. 9 is a simplified block diagram of a system for CW-seeded frequency comb generation according to another alternative embodiment of the invention.

Frequency comb generation using phase-correlated CW seeds can be generalized beyond the use of two frequency tones, as shown in FIG. 9.

FIG. 9 is a simplified block diagram of a system for CW-seeded frequency comb generation according to another alternative embodiment of the invention. In this configuration, modulator (Mod) generates two new frequency tones ($\omega_{1-}$ and $\omega_{1+}$) in addition to the original (master) carrier frequency ($\omega_0$) two sideband tones (($\omega_{1-}$ and $\omega_{1+}$) are used in the injection-locking system already described above, while the carrier tone is passed through and recombined with the emission of the slave lasers S1 and S2. The delay element 910 (T) can be used in the case when physical delays between the upper, the lower and the middle arms used in injection-locking systems are not balanced and induce an appreciable loss of phase correlation between the seed tones. Consequently, three correlated tones are used to drive mixer (M) to generate the frequency comb. Seeding by three, rather than two seed tones can be used to increase the SNR and efficiency of the frequency comb.

Figure 10:
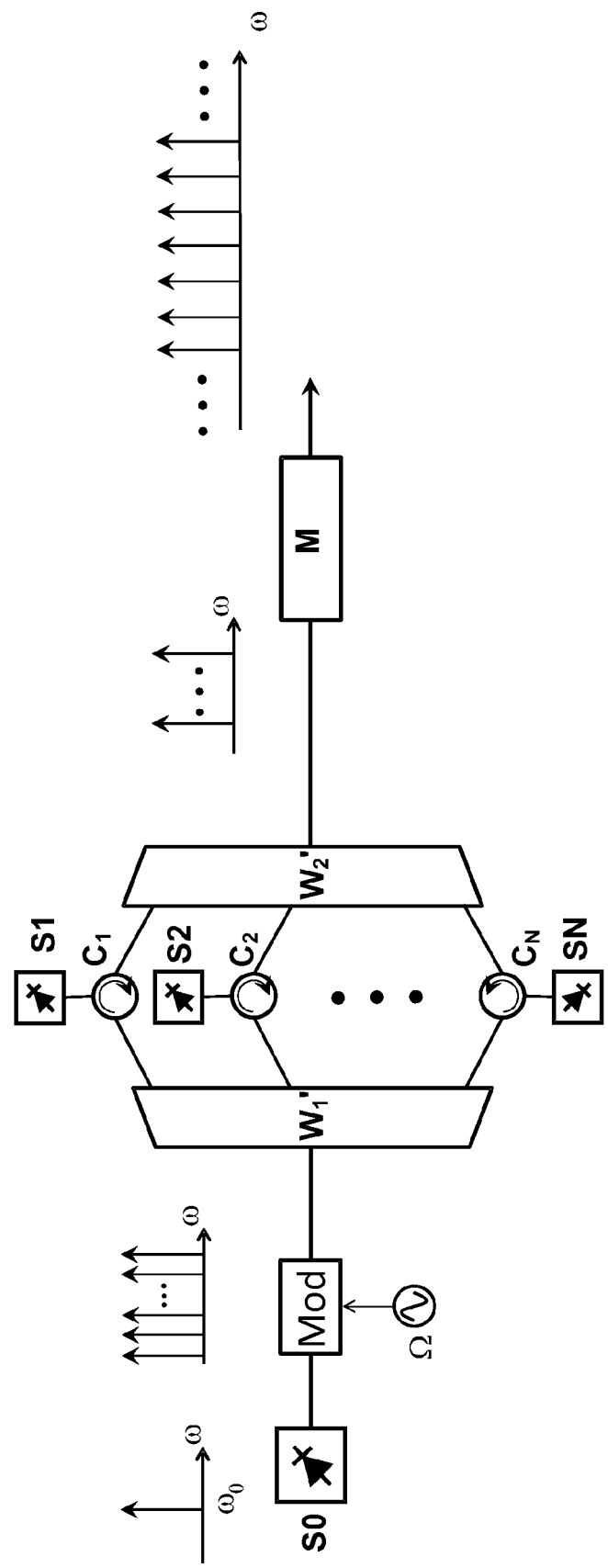
FIG. 10 is a simplified block diagram of a system for CW-seeded frequency comb generation according to a further alternative specific embodiment of the invention.

The last technique can be further generalize to include a larger number of phase-correlated tones, as shown in FIG. 10. In FIG. 10, a plurality of slave laser sources (S1 through SN) are provided and coupled to a matching plurality of optical circulators (C1 through CN). Multiple output optical splitter W1' is used to split and distribute the seed tones and multiple input optical combiner W2' is used to recombine the emissions of the frequency locked slave lasers.

Figure 11:
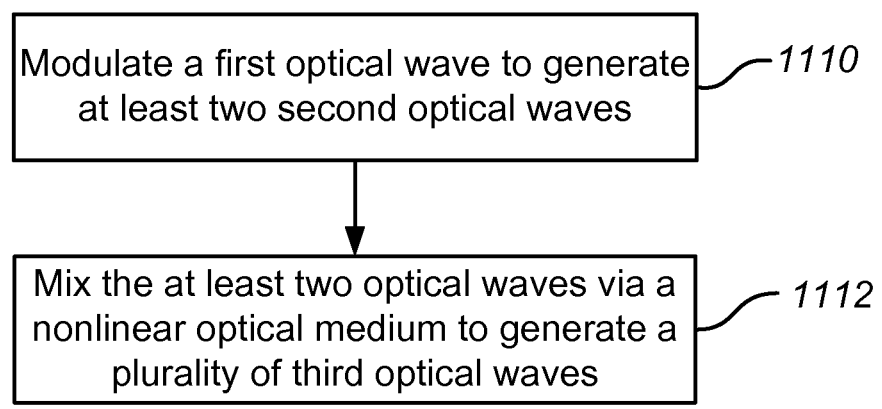
FIG. 11 is a simplified flowchart illustrating a method of generating a frequency comb according to an embodiment of the present invention.

FIG. 11 is a simplified flowchart illustrating a method of generating a frequency comb according to an embodiment of the present invention. The method includes modulating a first optical wave characterized by a first center frequency and a first spectral linewidth to generate at least two second optical waves phase-correlated with respect to each other and characterized by respective second center frequencies separated from each other by a frequency spacing (1110). The first optical wave can be a continuous wave in time domain, for example, provided using a CW semiconductor laser or a CW fiber laser. The at least two second optical waves can include three or more second optical waves.

The method also includes mixing the at least two second optical waves via a nonlinear optical medium to generate a plurality of third optical waves characterized by respective third center frequencies separated from each other by the frequency spacing (1112). Each of the plurality of third optical waves is characterized by the first spectral linewidth. The nonlinear optical medium can include a nonlinear optical fiber, a semiconductor waveguide, a nonlinear crystal, combinations thereof, or the like.

In an embodiment, each second center frequency is different from the first center frequency. In another embodiment, at least one third center frequency is different from the first center frequency and any of the second center frequencies.

It should be appreciated that the specific steps illustrated in FIG. 11 provide a particular method of generating a frequency comb according to an embodiment of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 12:
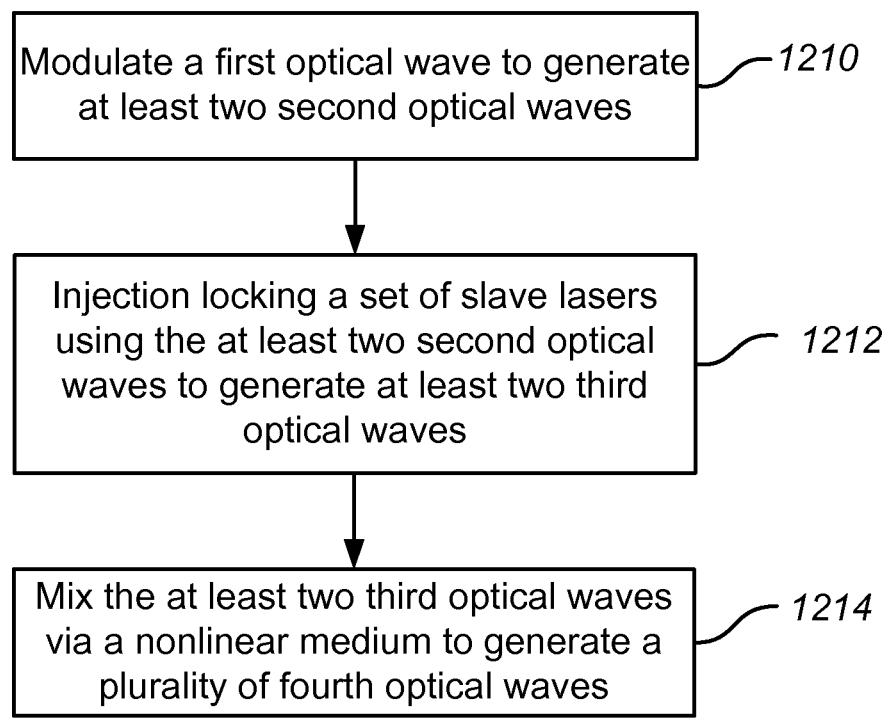
FIG. 12 is a simplified flowchart illustrating a method of generating a frequency comb according to an embodiment of the present invention.

FIG. 12 is a simplified flowchart illustrating a method of generating a frequency comb according to an embodiment of the present invention. The method includes modulating a first optical wave characterized by a first center frequency and a first spectral linewidth to generate at least two second optical waves phase-correlated with respect to each other and characterized by respective second center frequencies separated from each other by a frequency spacing (1210).

The method also includes injection locking a set of slave lasers using the at least two second optical waves to generate at least two third optical waves (1212). Each third optical wave is characterized by a respective second center frequency. The method further includes mixing the at least two third optical waves via a nonlinear optical medium to generate a plurality of fourth optical waves characterized by respective third center frequencies separated from each other by the frequency spacing (1214). Each of the plurality of fourth optical waves is characterized by the first spectral linewidth.

In an embodiment, each second center frequency is different from the first center frequency. In another embodiment, the first optical wave is a continuous wave in time domain. As an example, the nonlinear optical medium can include a nonlinear optical fiber, a semiconductor waveguide, a nonlinear crystal, combinations thereof, or the like. In a particular embodiment, at least one third center frequency is different from the first center frequency and any of the second center frequencies.

It should be appreciated that the specific steps illustrated in FIG. 12 provide a particular method of generating a frequency comb according to an embodiment of the present invention.

Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An apparatus for generating a frequency comb, the apparatus comprising:
   an optical source operable to provide a first optical wave;
   a wave splitter having an input port and at least two output ports, the input port being optically coupled to the optical source, wherein the wave splitter is operable to split the first optical wave into at least two separate second optical waves at the respective output ports, wherein the at least two second optical waves are characterized by respective first center frequencies separated from each other by a frequency spacing;
   a set of slave laser sources, wherein each slave laser source is coupled to a respective output port of the wave splitter and operable to emit a respective third optical wave at a respective first center frequency via injection locking;
   a wave combiner operable to combine the third optical waves emitted by the set of slave laser sources; and
   a nonlinear optical medium optically coupled to the wave combiner and operable to input the third optical waves and to output a plurality of fourth optical waves characterized by respective second center frequencies separated from each other by the frequency spacing.

2. The apparatus of claim 1 wherein the optical source comprises:
   a continuous wave optical source operable to provide a continuous optical wave; and an optical modulator optically coupled to the continuous wave optical source and operable to transform the continuous optical wave into the first optical wave.

3. The apparatus of claim 1 wherein the first optical wave comprises a stream of optical pulses.

4. The apparatus of claim 1 wherein at least one second center frequency is different from any of the first frequencies.

5. A method of generating a frequency comb, the method comprising:
providing a first optical wave;
coupling the first optical wave into a nonlinear optical medium; and
transforming the first optical wave via the nonlinear optical medium into a plurality of second optical waves characterized by respective center frequencies separated from each other by a frequency spacing.

6. The method of claim 5 wherein the first optical wave comprises a stream of optical pulses.

7. The method of claim 6 wherein the first optical wave is characterized by a plurality of first center frequencies separated from each other by the frequency spacing.

8. The method of claim 5 wherein the first optical wave comprises a continuous optical wave characterized by a first center frequency and a first spectral linewidth.

9. The method of claim 8 comprising, after providing the first optical wave and before coupling the first optical wave into the nonlinear optical medium, modulating the first optical wave to transform the first optical wave into an optical wave characterized by a plurality of second center frequencies separated from each other by the frequency spacing.

10. The method of claim 9 wherein each of the plurality of second optical waves is characterized by a second spectral linewidth.

11. An apparatus for generating a frequency comb, the apparatus comprising:
an optical source operable to provide a first optical wave; and
a nonlinear optical medium optically coupled to the optical source and operable to receive the first optical wave and to output a plurality of second optical waves characterized by respective center frequencies separated from each other by a frequency spacing.

12. The apparatus of claim 1 wherein the nonlinear optical medium comprises at least one of a nonlinear optical fiber, a semiconductor waveguide, a nonlinear crystal, or a crystalline waveguide.

13. The apparatus of claim 1 wherein the first optical wave comprises a stream of optical pulses.

14. The apparatus of claim 13 wherein the first optical wave is characterized by a plurality of first center frequencies separated from each other by the frequency spacing.

15. The apparatus of claim 11 wherein the first optical wave comprises a continuous optical wave.

16. The apparatus of claim 15 wherein the first optical wave is characterized by a first center frequency and a first spectral linewidth.

17. The apparatus of claim 16 comprising an optical modulator optically coupled between the optical source and the nonlinear optical medium, wherein the optical modulator is operable to transform the first optical wave into an optical wave characterized by a plurality of second center frequencies separated from each other by the frequency spacing.

18. The apparatus of claim 17 wherein each of the plurality of second optical waves is characterized by a second spectral linewidth.

19. The apparatus of claim 17 wherein each second center frequency is different from the first center frequency.

20. The apparatus of claim 17 wherein the nonlinear optical medium comprises at least one segment characterized by a third-order susceptibility that is not less than about $1 \times 10^{-23}$ $m^2/V^2$ measured at a frequency that is equal to one of the plurality of second center frequencies.

* * * * *